Feb. 28, 1939.  J. M. ENDICOTT  2,148,610
CULTIVATOR
Filed April 16, 1937  4 Sheets-Sheet 1

Inventor:
Joseph M. Endicott

Feb. 28, 1939. J. M. ENDICOTT 2,148,610
CULTIVATOR
Filed April 16, 1937 4 Sheets-Sheet 4
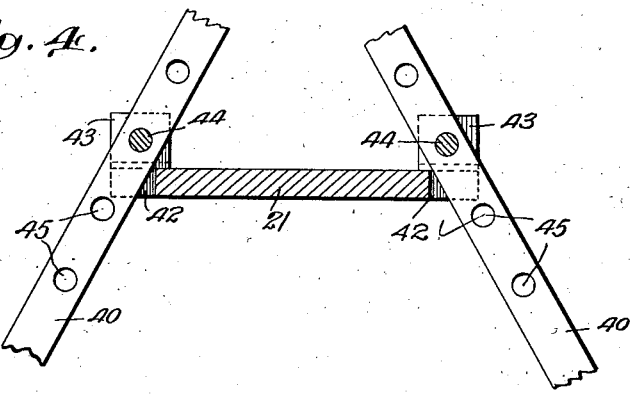
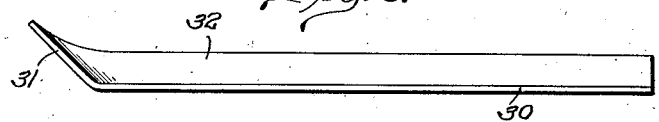
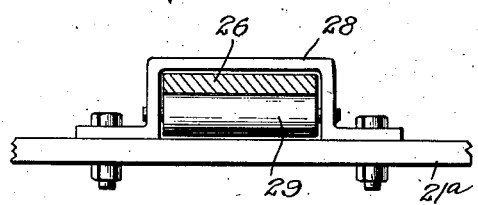
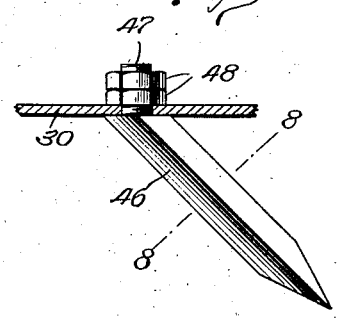
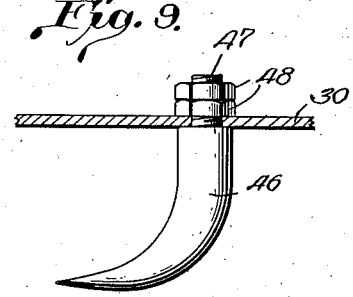
Inventor:
Joseph M. Endicott Patented Feb. 28, 1939

2,148,610

UNITED STATES PATENT OFFICE 2,148,610

CULTIVATOR

Joseph M. Endicott, Myrtle Point, Oreg.

Application April 16, 1937, Serial No. 137,329

7 Claims. (Cl. 97—143)

This invention relates to an improved agricultural machine and more particularly to a cultivator for use in fields of growing corn, cotton and other crops of a similar nature which require that the ground be broken up and weeds destroyed during growth of the crop.

One object of the invention is to provide a machine of this character of such construction that it may be used as a straddle-row cultivator and soil between the rows so acted upon that not only will weeds be destroyed but a crust broken up and lumps then reduced to fine particles which will be smoothed and thus provide the ground with a surface of such nature that moisture will be retained in the ground.

Another object of the invention is to provide a machine having mulching boards so constructed and mounted that they can be angularly adjusted in a vertical direction and supported in the adjusted position with their under surfaces and teeth depending therefrom in predetermined angular relation to the ground.

Another object of the invention is to so construct the machine that the frame thereof can be shifted vertically and thus accommodate the machine to height of the corn or other crop.

Another object of the invention is to provide a machine of this character which may be equipped with any predetermined number of sets of mulching boards.

It is another object of the invention to so construct the machine that by removing the supporting wheels and properly adjusting the mulching boards, it may be used as a drag or toothed harrow or for cultivating soil between rows of plants which cannot be conveniently cultivated when the wheels are in place.

The invention is illustrated in the accompanying drawings wherein.

Fig. 4 is a fragmentary sectional view illustrating the manner in which the strips or bars for supporting the mulching boards are secured in an adjusted position.

Fig. 5 is a view looking at the outer or upper side edge of one of the mulching boards.

Fig. 6 is a fragmentary view illustrating the manner of mounting supporting bars for mulching mechanism at sides of the cultivator frame.

Fig. 7 is a fragmentary view showing one of the mulching boards in section and showing an enlarged view of one of the teeth carried by the mulching boards.

Fig. 8 is a sectional view taken transversely through the tooth along the line 8—8 of Figure 7.

Fig. 9 is a view similar to Figure 7 with a modified form of tooth in place.

Figure 3:
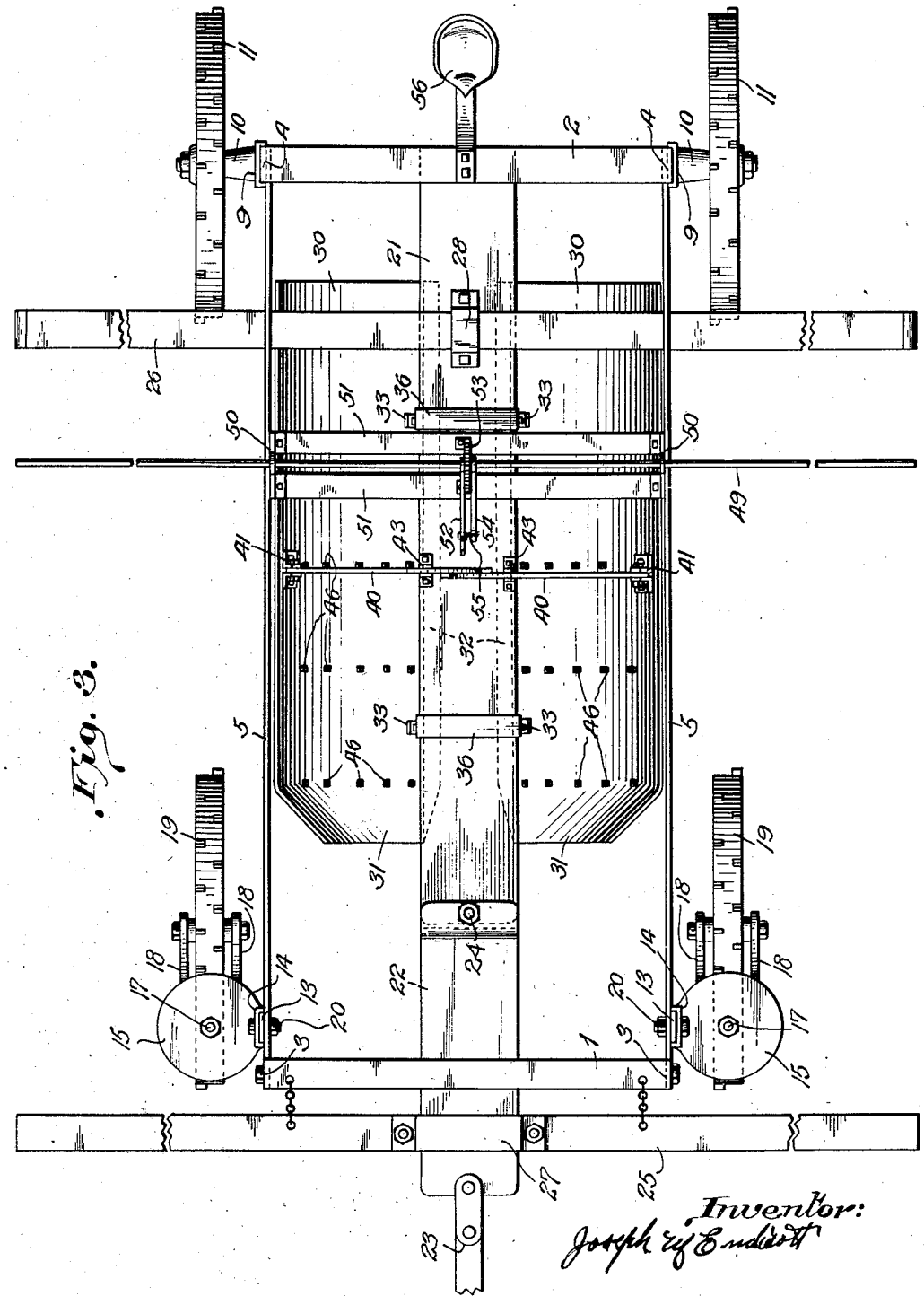
Fig. 3 is a top plan view thereof with the mulching boards and their supporting means at opposite sides of the frame omitted.

This improved agricultural machine is a cultivator of the straddle row type and has a main frame provided with front and rear yokes 1 and 2 having depending arms 3 and 4 to which ends of side bars 5 and 6 are secured. The arms of the rear yoke are of greater length than the arms of the front yoke and, upon referring to Figure 1, it will be seen that the side bars 6 extend rearwardly at a downward incline and serve very effectively to brace the yokes. Additional bracing bars 7 are provided for lower portions of the arms of the rear yoke and in order to assist in bracing the forward portion of the frame there have been provided bracing bars 8 extending forwardly at a downward incline from adjacent upper front ends of the braces 7 to lower ends of the side arms of the front yoke. Adjustable sections 9 which are formed with side flanges as shown in Fig. 3 are provided for the arms or legs of the rear yoke and at their lower ends these extensions or adjustable leg sections carry outstanding spindles 10 upon which the rear wheels 11 of the machine are rotatably mounted. It will, therefore, be possible to vertically adjust the rear portion of the frame and then secure the leg sections 9 in the adjusted position by replacing the bolts 12 which are removed during the adjustment. Mounting bars 13 are disposed vertically adjacent the front end of the frame and against these bars are disposed bars 14 of channeled metal which may be referred to as adjustable front leg sections and constitute shanks for disks 15. These disks constitute bearing disks with which other disks 16 are rotatably connected by bolts or equivalent pivot fasteners 17. The disks 16 carry depending arms or forks 18 for rotatably mounting the front wheels 19 and it will thus be seen that the front end of the frame is supported by casters which may be vertically adjusted by removing the bolts 20 with which the leg sections or shanks 14 are secured and replacing these bolts after the vertical adjustment has been accomplished. Ball bearings or the like may be provided between the disks.

A stringer 21 extends longitudinally of the frame midway the width thereof and is provided with a front section 22 to which a clevis 23 is secured in order that a tractor or the whiffle-tree of draft animal may be connected with the stringer.

A pivot bolt 24 connects the front section 22 with the main section of the stringer in order that turns can be easily made. In order that more than one set of mulching boards may be employed, there have been provided front and rear cross bars 25 and 26 which are formed of metal and are secured upon the stringer by clips or shackles 27 and 28. These cross bars are of sufficient length to extend well beyond opposite sides of the main frame and upon their projecting portions are mounted other stringers 21ª which are secured by shackles corresponding to the shackles 27 and 28 and similarly designated. By this arrangement, a center set of mulching boards and other sets at opposite sides of the main frame may be provided. It is to be understood that a single set of mulching boards under the main frame may be provided if so desired or the cross bars may be of sufficient length to permit additional side sets to be provided. Therefore, the machine may be built to cultivate one row of plants or three rows as shown, or any desired number of rows if the cross bars are of the proper length. The stringers and cross bars constitute an auxiliary frame which is to be vertically adjusted relative to the main frame in a manner to be hereinafter set forth. Rollers 29 are mounted in the shackles 28 in order that the stringers at sides of the frame may be slid along the cross bars and disposed parallel with the center stringer in desired spaced relation thereto to accommodate the machine to the distance between rows of plants in a field.

The sets of mulching boards are of a duplicate construction and each consists of a pair of boards 30 which may be formed of wood or metal. These boards are of rectangular formation and each has its front end formed with an upwardly inclined lip or flange 31 and along its inner or lower margin with an inclined flange or lip 32. The mulching boards are provided adjacent their inner margins with ears 33 and to these ears are attached the twisted lower end portions 34 of the arms 35 of front and rear yokes or hangers 36. Bracing strips 37 connect the arms of the front hanger with the arms of the rear hanger to prevent movement of the hangers out of proper relation to the mulching boards and each other. The hangers straddle the stringer with which they are associated and each has its arms formed with a plurality of vertically spaced openings 37ª to receive securing bolts 38 which are engaged through ears 39 depending from opposite side edges of the stringer and it will be readily understood that by removing the bolts, the hangers may be vertically adjusted and to dispose the inner end portions of the mulching boards in proper relation to the ground. This also permits the floating frame to be vertically adjusted towards or away from the upper ends of the hangers so that the machine may accommodate itself to the height of the corn or other plants which are to pass between the mulching boards and through space between arms of the hangers.

Figure 1:
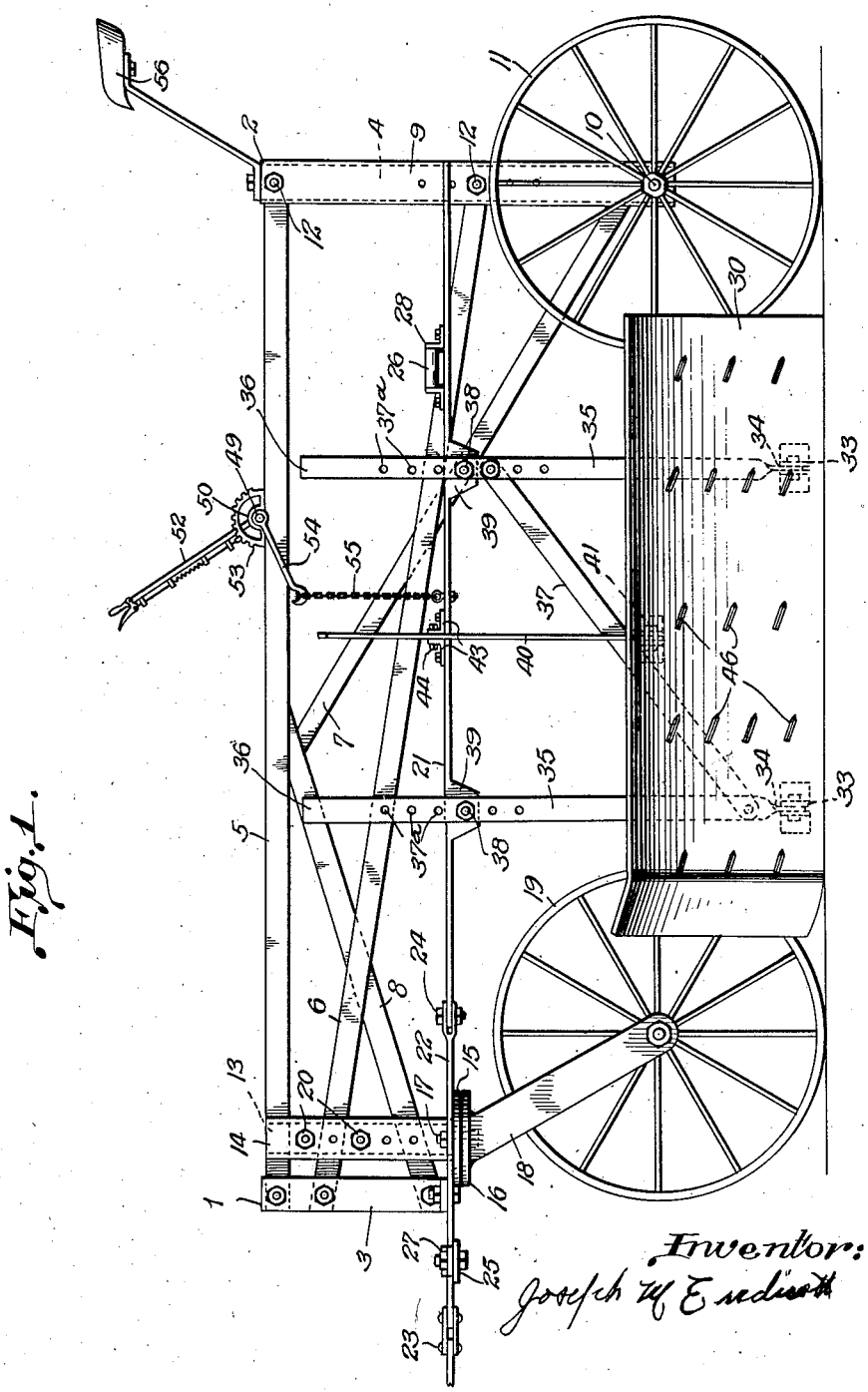
Fig. 1 is a side elevation of the improved agricultural machine.
Figure 2:
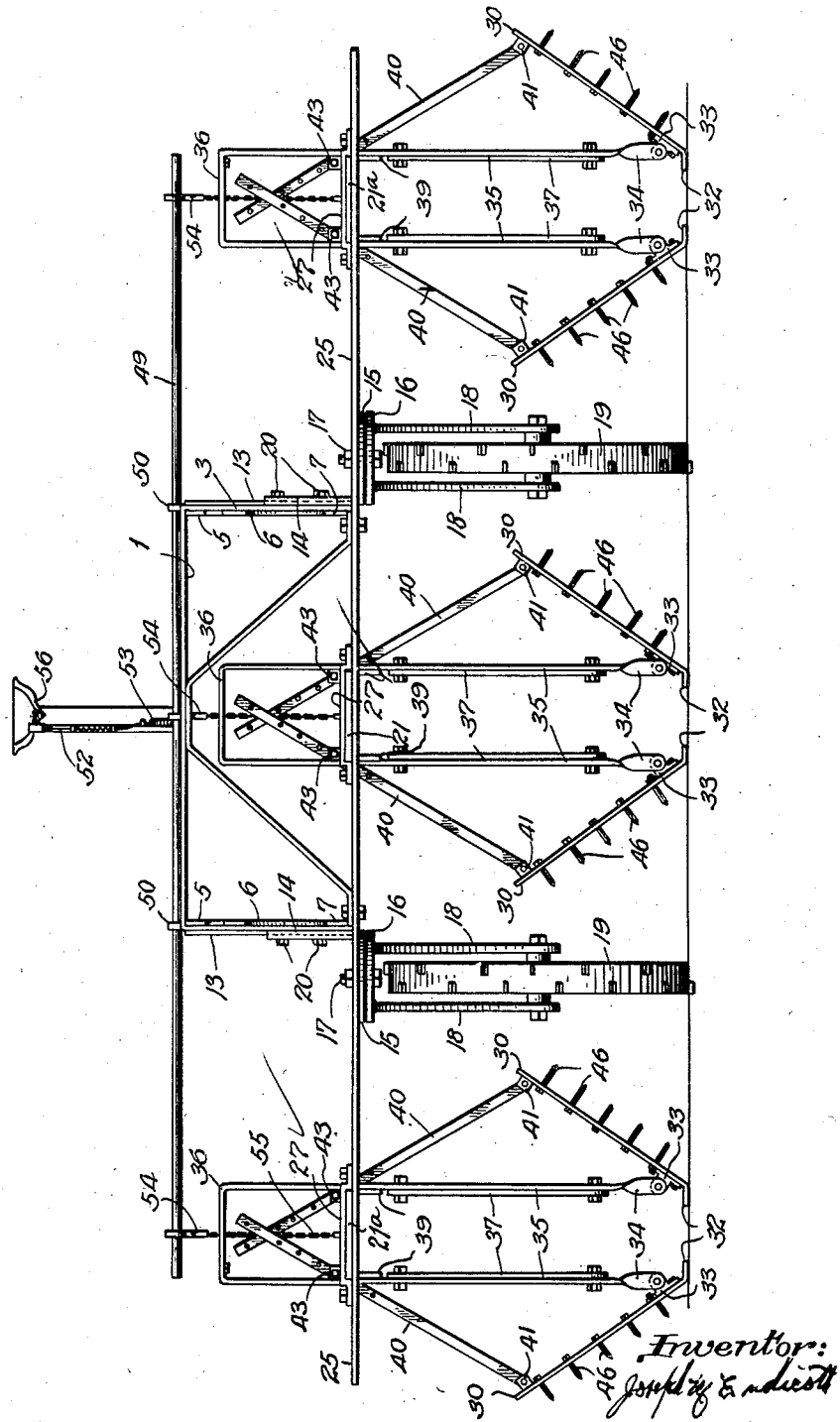
Fig. 2 is a front elevation of the machine.

The mulching boards are to be angularly adjusted when the machine is in use and in order to do so there have been provided strips or links 40 which have their lower ends pivotally connected to ears 41 carried by outer side edge portions of the boards substantially midway the lengths thereof. These strips extend upwardly in converging relation to each other and pass through notches 42 formed in side edge portions of the stringer between lugs or brackets 43 through which bolts 44 are passed and since the strips are formed with openings 45 spaced from each other longitudinally thereof, the strips can be shifted vertically when the bolts are removed to angularly adjust the boards, and when the bolts are replaced the boards will be secured in their adjusted positions. It will thus be seen that the boards may be disposed at a steep angle as shown in Figure 2 or they may be lowered until they are in a substantially horizontal position for bringing the teeth 46 of the boards into operative engagement with flat ground. These teeth are formed of strong metal and preferably extend downwardly at a rearward incline from the board as shown in Figures 1 and 7. Upper ends of the teeth are formed with threaded shanks 47 which extend through the boards and carry securing nuts 48 so that they will be securely held in place but may be removed when necessary. Referring to Figure 8, it will be seen that the teeth are diamond-shaped in cross section so that when the machine is in use, the teeth may have slicing engagement with the soil and not merely divide the soil into lumps, but slice it so that it will be divided into small pieces. Instead of forming the teeth as shown in Figures 7 and 8, they may be formed as shown in Figure 9, and referring to this figure, it will be seen that the teeth may be circular in cross section and extend from the boards at right angles thereto with their lower portions curved forwardly and tapered to fine points. These teeth are used for working fields which have developed a crust which could not be easily broken up by the teeth shown in Figure 7.

The mechanism for vertically adjusting the auxiliary frame is illustrated in Figures 1, 2 and 3 and referring to these figures, it will be seen that a shaft 49 extends transversely of the machine with its end portions projecting from opposite sides of the main frame. This shaft is rotatably mounted in bearing brackets 50 mounted at opposite ends of cross bars 51 which extend transversely across the main frame with their ends secured to the side bars 5. A latch lever 52 extends upwardly from the shaft midway the width of the main frame and the rack 53 for this lever is mounted upon the cross bars. When the latch lever is released from the rack and swung rearwardly to rotate the shaft, the arms 54 will be swung upwardly and since these arms are connected with the stringers by chains 55, the auxiliary frame will be drawn upwardly. It will thus be seen that the auxiliary frame can be vertically adjusted to dispose the stringers and the cross bars a sufficient height to permit growing corn or cotton to pass under them and, if necessary the hangers 36 may be released from the stringers to permit a further adjustment to clear corn which has grown to a considerable height. A seat 56 is provided at the rear of the main frame for use by the operator of the machine who can rest his feet upon the rear yoke.

The operation of this machine is as follows:

When this improved cultivator is in use, a tractor or draft animals are connected with the machine at the front thereof and the machine drawn across a field. The mulching boards are set so that their teeth will penetrate the ground since the rows of plants will be disposed between the boards and the surface of the soil at opposite sides of the rows will be acted upon and broken up into lumps over which the boards will pass during forward motion of the machine. Any large lumps of dirt will be caught under the upwardly inclined lips or flanges along front ends of the boards and broken as they pass under the boards and thus reduced to small lumps which will be further broken up by the teeth. The fact that the teeth are shaped as shown will cause them to easily slide their way through the lumps and reduce them to fine particles which will be smoothed by the boards and thus form a smooth and compact surface which will allow rain to easily penetrate the ground and also serve to retain moisture in the soil. It should be noted that the side flanges of the boards serve to shield the growing plants and very effectively prevent small plants from being covered during cultivation and thus killed by being buried in the ground. As the plants grow, there will still be ample room for them to pass between the arms of the yokes carrying the mulching boards and when they reach such a height that they cannot pass under the cross bars and stringers with the parts in the position shown in the drawings, vertical adjustment can be easily made to raise the level of the auxiliary frame. The mulching boards can also be easily and quickly angularly adjusted to accommodate themselves to the ground being worked.

Having thus described the invention, what is claimed is:

1. In a cultivator, a frame adapted to be moved across a field, and mulching boards below said frame spaced transversely from each other for operating upon soil at opposite sides of a row of plants and being pivotally mounted along their inner edges for vertical swinging adjustment transversely of the frame and being provided with upwardly extending lips across their front ends and along their inner side edges the side lips serving as runners when the boards are tilted upwardly, said boards being provided with depending teeth for acting upon soil over which the boards pass.

2. In a cultivator, a main frame, an auxiliary frame suspended from the main frame, means for vertically adjusting the auxiliary frame and supporting the same in an adjusted position, yokes carried by said auxiliary frame and being vertically adjustable, mulching boards pivoted to said yokes for vertical swinging adjustment transversely of the frames and being spaced from each other for operating upon soil at opposite sides of a row of plants, and means for adjusting the boards and supporting the same in an adjusted position.

3. In a cultivator, a main frame, a stringer extending longitudinally of the main frame intermediate the width thereof, cross bars extending transversely of said stringer, side stringers spaced from opposite sides of said main frame and connected with said cross bars, a rock shaft extending transversely across the main frame with end portions projecting from opposite sides thereof over the side stringers, a latch lever carried by said shaft for turning the shaft, a rack for engagement by the latch lever to hold the rock shaft in an adjusted position, arms extending from said shaft over said stringers and connected therewith for shifting the stringers and cross bars vertically and supporting the same in a vertically adjusted position, yokes carried by said stringers and having arms depending therefrom, mulching boards at opposite sides of said yokes having their inner side edge portions pivotally connected with the arms of the yokes and mounting the boards for vertical swinging adjustment, and means for angularly adjusting the boards and supporting the same in adjusted positions.

4. In a cultivator, a main frame, a stringer extending longitudinally of the frame intermediate the width thereof, means for supporting said stringer and vertically adjusting the position thereof, yokes straddling said stringer and having arms extending downwardly from opposite sides of the stringer, means for securing the arms to the stringer and supporting the yokes in vertically adjusted positions, mulching boards at opposite sides of said yokes having inner side edge portions pivotally connected with lower ends of the arms for vertical swinging adjustment of the boards, and means for adjusting the positions of the boards and supporting the boards in the adjusted positions.

5. In a cultivator, a main frame, a stringer extending longitudinally of the main frame, ears at opposite sides of the stringer, yokes straddling said stringer with their arms extending downwardly at opposite sides thereof, fasteners passed through the ears and the arms of the yokes to secure the yokes in vertically adjusted positions, mulching boards at opposite sides of said yokes having inner side edge portions pivotally connected with lower ends of the arms of said yokes for vertical swinging adjustment, anchoring members at opposite sides of said stringer intermediate said ears, hangers pivoted to outer side edge portions of said boards and extending upwardly in converging relation to each other and over the stringer from opposite sides thereof, and fasteners passed through the anchoring members and through said hangers to secure the hangers in set positions with the boards supported in vertically adjusted positions by the hangers.

6. In a cultivator, a main frame including end yokes, side bars extending between said yokes, vertical bars adjacent front ends of opposite sides of the frame, extension members for arms of the rear yoke adjustable vertically and extending downwardly beyond lower ends of the arms, rear wheels carried by lower ends of the extension members, shanks extending vertically along said vertical bars and secured thereto in vertically adjusted positions, disks at lower ends of said shanks, front wheels, forks for the front wheels having disks at their upper ends disposed under the disks of the shanks and rotatably connected therewith to mount the front wheels for steering movements, a stringer extending longitudinally of said frame, yokes carried by said stringer and having their arms extending downwardly therefrom, mulching boards pivoted to arms of the last mentioned yokes for vertical swinging adjustment, and means for securing the mulching boards in vertically adjusted positions.

7. In a cultivator, a frame, yokes extending vertically and adjustably mounted, mulching boards at opposite sides of said yokes having inner side edge portions pivotally connected with the arms of the yokes for vertical swinging adjustment, means for shifting the boards vertically about their pivots and supporting the boards in adjusted positions, teeth carried by said boards and extending downwardly from under surfaces thereof, supporting wheels for said frame, and mountings for the wheels connected with the frame and being vertically adjustable and removable from the frame.

JOSEPH M. ENDICOTT.